(12) United States Patent
Chang et al.

(10) Patent No.: US 6,672,563 B2
(45) Date of Patent: Jan. 6, 2004

(54) BALL VALVE HAVING A MAGNETIC SEAT SEALING DEVICE

(75) Inventors: Chia-Yang Chang, Taipei Hsien (TW); Ching-Huan Tseng, Hsinchu (TW); Kuo-Hung Lin, Taipei (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 225 days.

(21) Appl. No.: 09/989,124

(22) Filed: Nov. 21, 2001

(65) Prior Publication Data

US 2002/0063229 A1 May 30, 2002

(30) Foreign Application Priority Data

Nov. 30, 2000 (TW) ...................................... 89220774 U

(51) Int. Cl.⁷ ................................................ F16K 5/20
(52) U.S. Cl. ........................ 251/170; 251/65; 251/192; 251/315.12
(58) Field of Search .......................... 251/65, 157, 170, 251/192, 315.01–315.16

(56) References Cited

U.S. PATENT DOCUMENTS

| | | | | |
|---|---|---|---|---|
| 2,640,676 A | * | 6/1953 | Habgood ..................... | 251/192 |
| 3,206,160 A | * | 9/1965 | Bennett ....................... | 251/65 |
| 4,580,761 A | * | 4/1986 | Silcox et al. ............. | 251/65 X |
| 4,911,407 A | * | 3/1990 | Paul, Jr. ...................... | 251/172 |
| 4,928,921 A | * | 5/1990 | Steele ............... | 251/315.09 X |
| 4,968,000 A | * | 11/1990 | Hubertson et al. .. | 251/315.13 X |
| 5,114,412 A | * | 5/1992 | Flinchbaugh ............. | 251/65 X |
| 6,340,029 B1 | * | 1/2002 | Jun ........................ | 251/172 X |

* cited by examiner

Primary Examiner—Gene Mancene
Assistant Examiner—Eric Keasel
(74) Attorney, Agent, or Firm—Kenyon & Kenyon

(57) ABSTRACT

A ball valve having a magnetic seat sealing device comprises a valve body, a valve seat, a valve ball, a valve stem and a valve bonnet, wherein the valve seat is disposed within a valve body cavity of the valve body, the valve ball being rotatably disposed on the valve seat, the valve bonnet engaging the valve body to confine the valve body cavity, the valve stem passing through the valve bonnet and drivingly engaging the valve ball; and being characterized by comprising a magnetic seat sealing device that employs a magnetic mechanism to control the metal valve seat, so that when the ball valve is in a closed condition, the magnetic mechanism exerts a magnetic force to the metal valve seat to further tighten and seal the valve seat against the valve ball; and when the ball valve is in an open condition, the magnetic force is released to allow the metal valve seat to return its original position; whereby the metal ball valve can be operated by a low operative torque and maintaining superior sealing effect.

5 Claims, 3 Drawing Sheets

BALL VALVE HAVING A MAGNETIC SEAT SEALING DEVICE

BACKGROUND OF THE INVENTION

1. Field of the Invention

The present invention relates to a ball valve having a valve seat sealing device, and particularly to a ball valve having a seat sealing device operated by a magnetic force for selectively compressing the valve seat against the valve ball, so that not only the leak-tight sealing effect can be greatly improved but also the wear between the valve ball and seat and the operative torque required for rotating the valve can be reduced.

2. Description of Related Art

A valve seat is a component of a ball valve. When the ball valve in a closed condition, contact surfaces are required to create between a valve ball and a valve body, so as to develop a sealing effect for preventing fluid leakage. In the past, a conventional ball valve, in order to achieve the sealing effect, normally applied soft material with resilience, such as Teflon or the like, to manufacture the valve seat for providing sealing surfaces between the valve seat and valve ball. Such soft material, however, will be deformed and distorted under a high-temperature and high-pressure condition, and therefore cannot provide a good sealing effect required for use in a high-temperature and high-pressure environment. U.S. Pat. Nos. 4,911,407 and 4,928,921 therefore provide a valve seat made from metallic material.

It is, however, difficult to manufacture a metal valve seat that can maintain good sealing effect, because of the high hardness and rigidity of metallic materal. In U.S. Pat. Nos. 4,911,407 and 4,928,921, metallic material with flexibility is applied to develop the leak-tight sealing effect between the valve seat and valve ball. Such a technology, however, is required a relatively high level of manufacturing technology that makes the cost for manufacturing increase greatly. Besides, in operating a ball valve having such kind of metal valve seat with flexibility, since the valve ball always tightly compresses against the valve seat, an increased friction force is created between the valve ball and the valve seat, such that an operative torque required for rotating the valve ball is greatly increased, and wear between the valve ball and the valve seat is also increased, which significantly reduces the life of the ball valve. In U.S. Pat. No. 4,968,000, springs are applied to associate with a metal valve seat to allow the valve seat to slide within the ball valve. U.S. Pat. No. 5,140,150 combines the technology of the flexible valve seat with the slidable valve seat. Since the resilience of a spring will deteriorate under high temperature, such a technology of using springs is not reliable in providing a ball valve to be used under high temperature environment.

SUMMARY OF THE INVENTION

Accordingly, an object of the present invention is to provide a ball valve having a magnetic seat sealing device that applies a magnetic mechanism to control a valve seat for selectively compressing against a valve ball, so that when the ball valve is in a closed condition, the magnetic mechanism exerts a magnetic force to the metal valve seat for further tightly compressing against the valve ball; and when the ball valve is in an open condition, the magnetic force is released to allow the valve seat to return its original position. In this way, the operative torque required for rotating the valve ball is significantly minimized, while maintaining the optimal sealing effect between the valve ball and the seat.

Additional objects, advantages, construction, and features of the present invention will become apparent from the following description and the appended claims, taken in conjunction with the accompanying drawings.

PREFERRED EMBODIMENT OF THE PRESENT INVENTION

Figure 1:
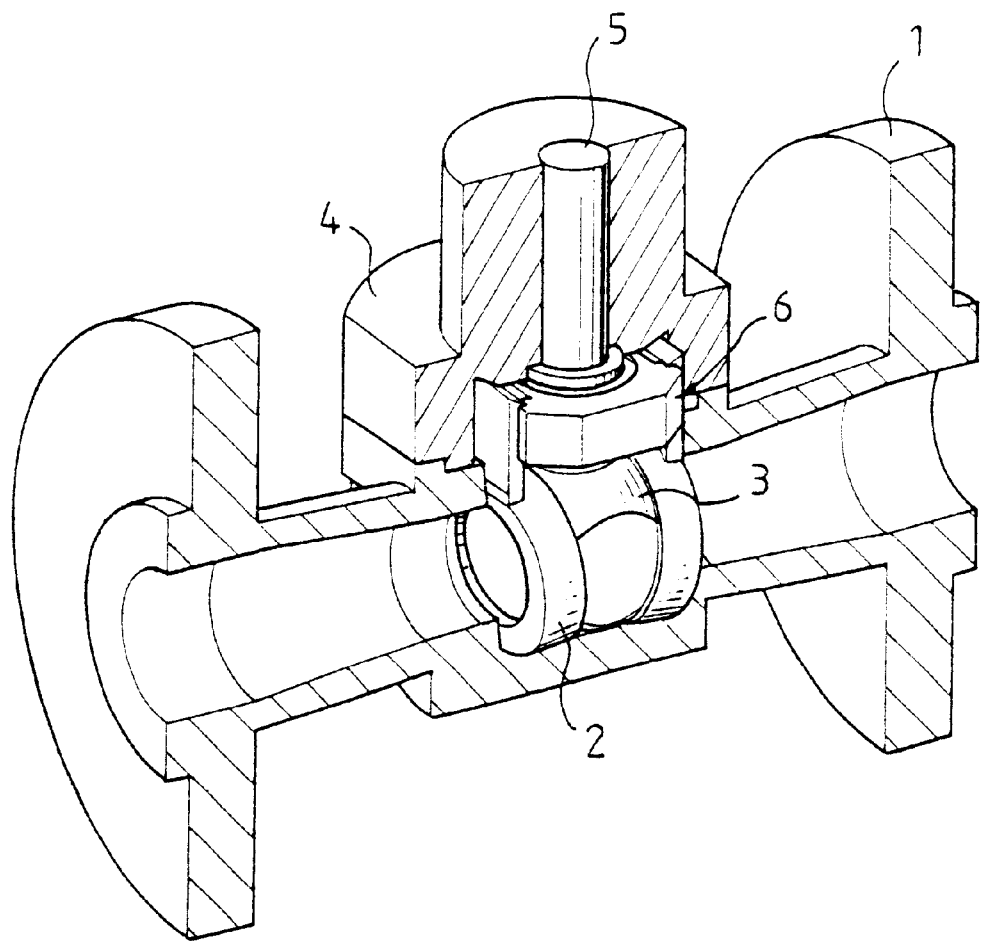
FIG. 1 is a schematically and fragmentally perspective view of the ball valve in accordance with the preferable embodiment of the present invention, in which the valve body and the flow passage are partially removed to facilitate the viewing of the internal construction thereof.

Certain terminology may be employed in the following description for convenience rather than for any limiting purpose. For example, the terms "upper," "lower," "right," and "left" designate directions in the drawings to which reference is made. Terminology of similar import other than the words specifically mentioned above likewise is to be considered being used for purposes of convenience rather than in any limiting sense.

Figure 2:
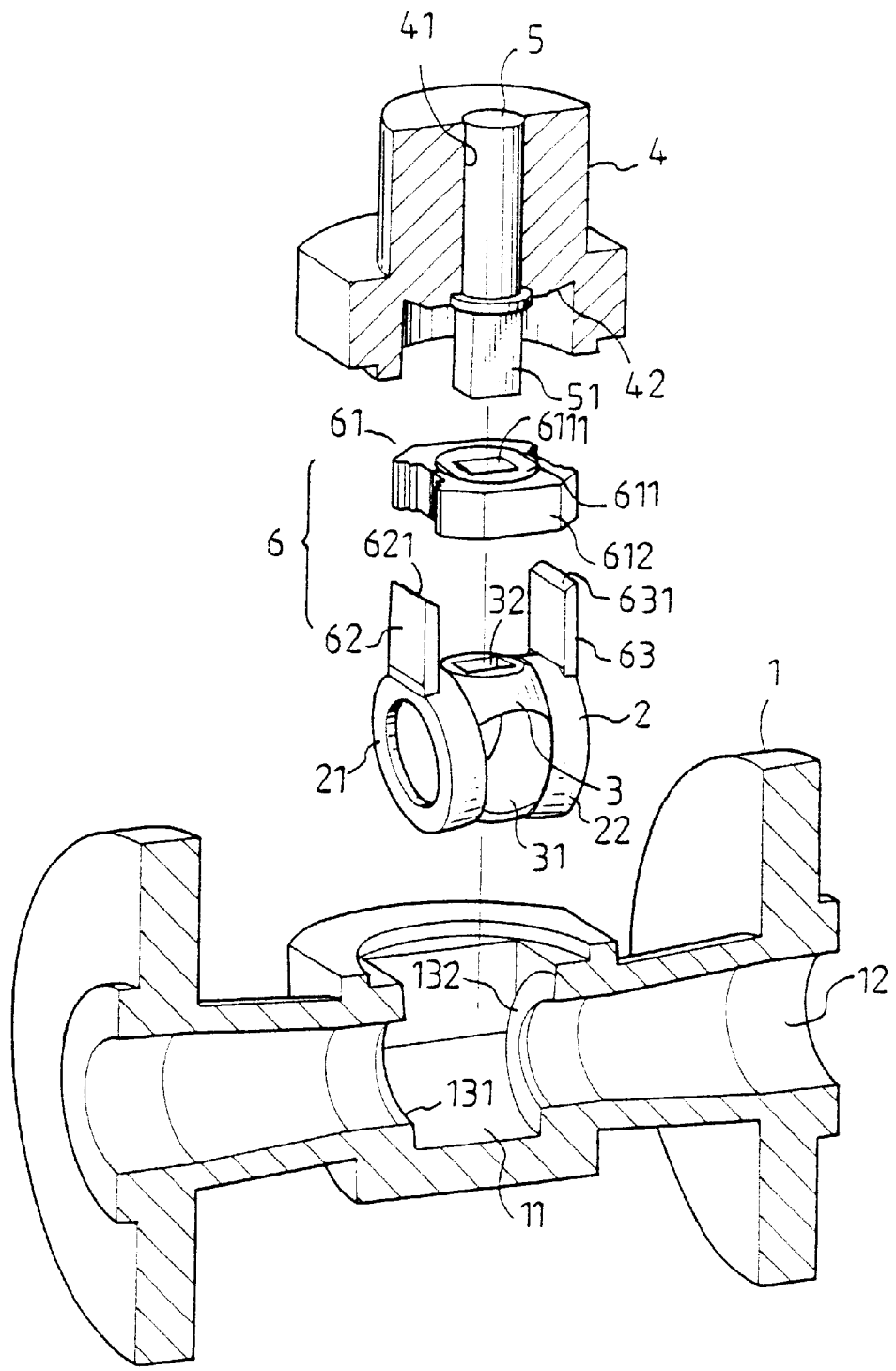
FIG. 2 is a schematically and fragmentally exploded view of the ball valve in accordance with the preferable embodiment of the present invention, in which the valve body and the flow passage are partially removed to facilitate the viewing of the internal construction thereof.

Referring to FIGS. 1 and 2, a ball valve having a magnetic seat sealing device in accordance with the preferable embodiment of the present invention primarily comprises: a valve body 1, a valve seat 2, a valve ball 3, a valve bonnet 4, a valve stem 5 and a magnetic seat sealing device 6; in which the valve body 1 comprises a valve body cavity 11 and a flow passage 12 intersecting and in fluid communication with the valve body cavity 11. The valve seat 2 comprises two valve seat rings 21 and 22 disposed within the valve body cavity 11 and forming a wedge valve seat with a V-shaped configuration. The valve seat rings 21 and 22 respectively engage the contact surfaces 131 and 132 within the valve body cavity 11. The valve ball 3 is substantially in a spherical construction formed therein with a transverse flow passage 31 to be selectively in fluid communication with the flow passage 12, and a rectangular rotationally driving hole 32 at a top thereof. The valve ball 3 is rotatably seated on the seat rings 21 and 22 of the valve seat 2 within the valve body cavity 11 for selectively closing or opening the flow passage 12.

The valve bonnet 4 engages the valve body 1 to confine the valve body cavity 11 and centrally formed with a valve stem hole 41. The valve stem 5 is substantially a round rod having a lower end formed as a rotationally driving end 51 having a rectangular cross-section, and an upper end for connecting a valve operator (not shown), such as a valve handle, valve wheel, servomotor or the like. The valve stem 5 passes through the valve stem hole 41 of the valve bonnet 4, engaging the rotationally driving hole 32 of the valve ball 3 by means of the rotational driving end 51 thereof, so that the valve ball 3 can be rotated to selectively close or open the flow passage 12.

Figure 3:
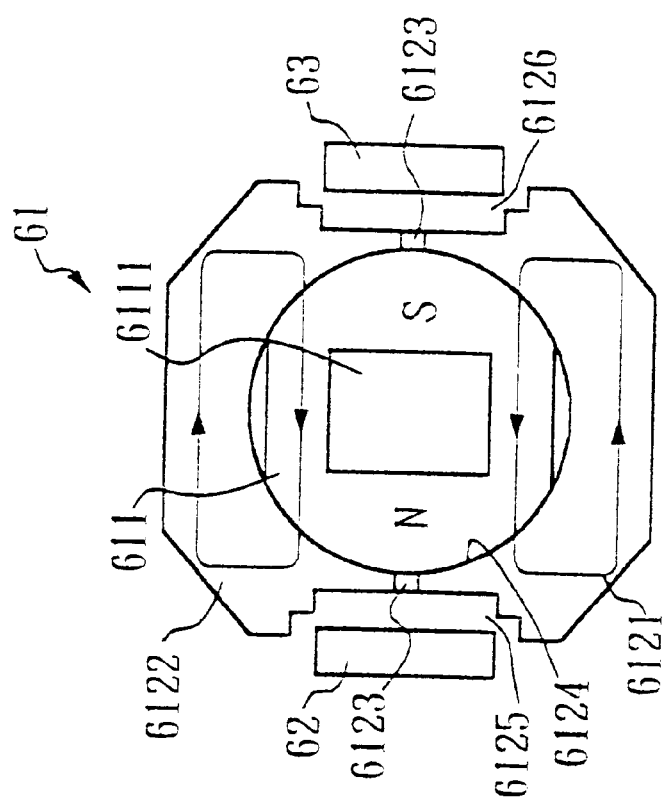
FIG. 3 is a schematically operational view of the preferable embodiment of the present invention showing that the circular permanent magnet is rotated within the magnetic permeable block to a place where two magnetic poles of the magnet face to two opposite cutouts of the magnetic permeable block, so that a magnetic circuit is established within two magnetic permeable block halves, respectively, and magnetic induction lines do not pass through the cutouts, rendering that magnetic force does not exert to two magnetically actuating blocks.

As illustrated in FIGS. 2 and 3, the magnetic seat sealing device 6 comprises a magnetic mechanism 61 and two magnetically actuating blocks 62 and 63. The magnetic mechanism 61 comprises a substantially circular permanent magnet 611 centrally formed with a rectangular rotationally driving hole 6111 for engaging the rotationally driving end 51 of the valve stem 5 and coaxially rotatable together with the valve stem 5, and a magnetic permeable block 612 including two magnetic permeable block halves 6121 and 6122 made of magnetic permeable material. The two magnetic permeable block halves 6121 are formed integrally with nonmagnetic material 6123 interposed between the block halves 6121 and 6122. A circular recess 6124 is centrally formed in the magnetic permeable block 61 for receiving the circular permanent magnet 611, so that the circular magnet 611 can freely rotate within the circular recess 6124. The magnetic permeable block 612 is formed with two opposite cutouts 6125 and 6126 at a place nearby the non-magnetic material 6123 interposed between two block halves 6121 and 6122.

Two magnetically actuating blocks 62 and 63 made of magnetic permeable material are integrally formed with the valve seat rings 21 and 22, respectively, extending in a direction substantially parallel to the valve stem 5. The two magnetically actuating blocks 62 and 63 are oppositely arranged to be received respectively within the cutouts 6125 and 6126 of the magnetic permeable block 612, so that the valve seat rings 21 and 22 can be actuated to compress against the valve ball 3 when the magnetically actuating blocks 62 and 63 are attracted by the magnetic force of the permanent magnet 611, and so that a superior leak-tight sealing can be maintained between the valve ball 3 and the valve seat rings 21 and 22. The magnetically actuating blocks 62 and 63 are respectively formed at its free end a slant 621 and a slant 631 extending upwardly and outwardly.

Referring to FIGS. 1 and 2, the valve bonnet 4 is formed at its inner periphery a guiding slope 42 extending inwardly and downwardly to associate with the slants 621 and 631 of the magnetically actuating blocks 62 and 63, such that when the magnetically actuating blocks 62 and 63 are magnetically attracted by the magnet 611 to move toward a center of the magnet 611, the magnetically actuating blocks 62 and 63 exert a downward force to the valve seat rings 21 and 22.

As illustrated in FIGS. 2 and 3, when the valve ball 3 is in an open condition, the transverse flow passage 31 of the valve ball 3 is in fluid communication with the flow passage 12. At this time, N and S magnetic poles of the permanent magnet 611 are facing to the cutouts 6125 and 6126. Since magnetic induction lines or lines of magnetic force take the shortest path, magnetic circuits are only established within the magnetic permeable block halves 6121 and 6122, without passing through the cutouts 6125, 6126 and the place where the magnetically actuating blocks 62, 63 are located. The magnet 611, therefore, does not exert a magnetic force to attract the magnetically actuating blocks 62 and 63.

Figure 4:
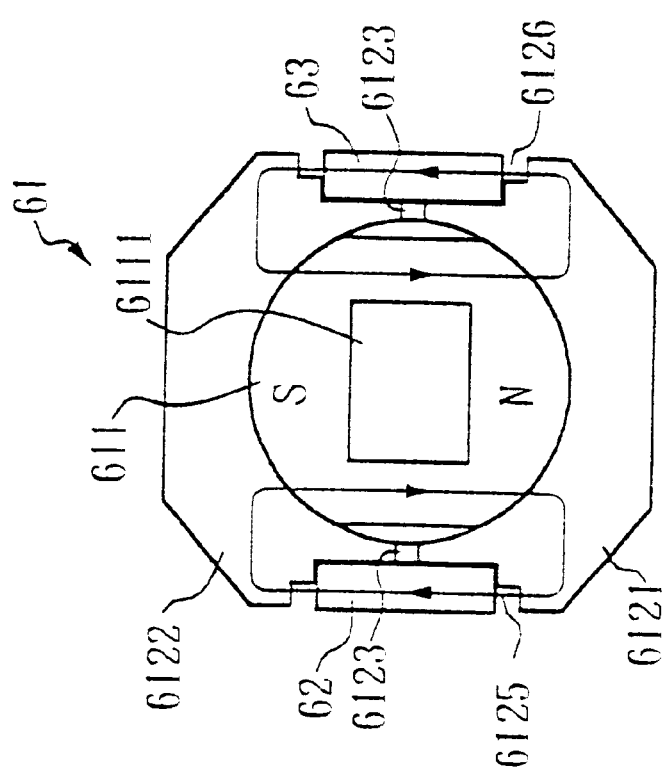
FIG. 4 is another schematically operational view of the preferable embodiment of the present invention showing that the circular permanent magnet is rotated within the magnetic permeable block to an place where two magnetic poles of the magnet are located farthest away from two opposite cutouts of the magnetic permeable block, so as to allowing magnetic induction lines to pass through the cutouts to establish magnetic circuit for exerting a magnetic force to the magnetically actuating block move toward the magnet.

As best illustrated in FIGS. 2 and 4, when the valve stem 5 is rotated for approximately 90° to place the valve ball 3 in a closed condition, the valve ball 3 obstructs the flow passage 12. At this time, the circular permanent magnet 611 is rotated by the valve stem 5 to a place where the N and S magnetic poles of the magnet 611 are located farthest away from the cutouts 6125 and 6126 (see FIG. 4). Since magnetic induction lines take the shortest path, and the non-magnetic material interposed between two magnetic permeable block halves 6121 and 6122 is of inferior magnetic permeability, magnetic induction lines pass through the magnetic permeable block halves 6121, 6122, the cutouts 6125, 6126 and the magnetically actuating blocks 62, 63 to exert a magnetic force to the magnetically actuating blocks 62, 63 to move toward the magnet 611, so that two valve seat rings 21, 22 are driven to compress against the valve ball 3 by the mechanically actuating blocks 62 and 63.

Referring to FIG. 2, when two magnetically actuating blocks 62 and 63 are actuated by the magnetic force of the magnet 611 to move horizontally toward the magnet 611, the slants 621, 631 of the magnetically actuating blocks 62, 63 in association with the guiding slope 42 of the valve bonnet 4 provide a downward component force to the valve seat rings 21, 22, so that the valve seat rings 62, 63 further tightly compress against the contact surface 131, 132 of the valve body cavity 11, guiding the valve seat rings 21, 22 to further tightly compress against the surface of the valve ball 3 for providing a superior leak-tight sealing effect.

The valve seat sealing device that is made based on the novel technical concept, can not only reduce the operative torque and wear of a ball valve by a simplified and reliable construction that can be manufactured easily at a low cost, but also provide a superior leak-tight sealing effect.

The above-described embodiment of the present invention is intended to illustrate only. Numerous alternative embodiments may be devised by persons skilled in the art without departing from the scope of the following claims.

What is claimed is:

1. A ball valve having a magnetic seat sealing device, comprising:

a valve body formed with a valve body cavity and a flow passage intersecting and in fluid communication with said valve body cavity;

a valve seat, including at least one seat ring disposed within said valve body cavity;

a valve ball rotatably disposed on said valve seat within said valve body cavity for selectively closing/opening the flow passage of the valve body;

a valve bonnet engaging the valve body to confine said valve body cavity and formed with a valve stem hole;

a valve stem passing through said valve stem hole of the valve bonnet and rotatably drivingly engaging said valve ball; characterizing by comprising:

a magnetic seat sealing device comprising:

a magnetic mechanism including a permanent magnet having a center coaxial with the valve stem and rotatable together with the valve stem; a magnetic permeable block including two magnetic permeable block halves made of magnetic permeable material which are integrally interconnected by non-magnetic material integrally interposed therebetween, and centrally formed with a circular recess for receiving the magnet to rotate therein; and at least one magnetically actuating block made of magnetic permeable material and integrally engaging said valve seat ring for actuating the valve seat ring to tightly compress against the valve ball by a magnetic force of the permanent magnet and to maintain a high leak-tight sealing effect between the valve ball and seat.

2. The ball valve having a magnetic seat sealing device of claim 1, wherein the permanent magnet is centrally formed with through hole to allow the valve stem passing therethrough and rotatable together with the valve stem.

3. The ball valve having a magnetic seat sealing device of claim 1, wherein the two magnetic permeable block halves are formed with two opposite cutouts at the interconnection between two block halves for receiving therein the magnetically actuating block.

4. The ball valve having a magnetic seat sealing device of claim 1, wherein the valve seat comprises two valve seat rings oppositely and symmetrically disposed within the valve body cavity to form a V-shaped configuration; and the valve body cavity provided with a V-shaped contact surfaces for receiving and contacting two valve seat rings.

5. The ball valve having a magnetic seat sealing device of claim 4, wherein the valve bonnet is formed at its inner periphery a guiding slope extending inwardly and downwardly, and the magnetically actuating block formed at its free end a slant extending upwardly and outwardly to associate with the guiding slope of the valve bonnet so as to exert a downward component force to the valve seat ring, when the magnetically actuating block is magnetically attracted and moved by the permanent magnet.

* * * * *